United States Patent

Cousino

[15] 3,685,754

[45] Aug. 22, 1972

[54] TAPE CARTRIDGE

[72] Inventor: Ralph E. Cousino, Toledo, Ohio

[73] Assignee: Orrtronics, Inc., Perrysburg, Ohio

[22] Filed: Feb. 27, 1969

[21] Appl. No.: 802,981

[52] U.S. Cl. ............242/55.19 A, 226/181, 226/183, 226/190, 242/197

[51] Int. Cl. ............B65h 17/48

[58] Field of Search....242/55.19 A, 55.19, 197, 198, 242/199, 200, 194; 279/100.2 Z; 226/178, 190, 191, 181, 183

[56] References Cited

UNITED STATES PATENTS

| | | | |
|---|---|---|---|
| 2,681,224 | 6/1954 | Bessire | 226/178 UX |
| 2,865,632 | 12/1958 | Vogel et al. | 226/178 UX |
| 3,219,246 | 11/1965 | Kihara | 226/190 X |
| 3,285,526 | 11/1966 | Moore | 242/55.19 |
| 3,482,792 | 12/1969 | Auld | 242/55.19 |
| 3,511,449 | 5/1970 | Mathus et al. | 242/55.19 A |
| 3,310,214 | 3/1967 | Nesin | 226/181 |

*Primary Examiner*—Billy S. Taylor
*Attorney*—Molinare, Allegretti, Newitt & Witcoff

[57] ABSTRACT

A cartridge for an endless magnetic tape wherein the tape is driven at a speed slower than the speed of a tape drive capstan in a cooperating tape transport. The capstan engages and drives at least one large diameter portion of a drive wheel which is rotatably mounted in the cartridge. The drive wheel has a small diameter portion which engages and drives the endless tape to pull the tape past at least one tracking head. An idler wheel urges the tape against the drive wheel to maintain a positive tape drive.

2 Claims, 4 Drawing Figures

INVENTOR:
RALPH E. COUSINO.
BY
[signature]
ATT'YS.

TAPE CARTRIDGE

BACKGROUND OF THE INVENTION

The invention relates generally to endless magnetic tape cartridges and, more particularly, to an endless magnetic tape cartridge for driving the tape at a speed slower than a constant speed tape drive capstan in a cooperating tape transport.

Tape cartridge and cassette recorders and players have become increasingly popular for use in the home, in the automobile and in business. Technological advances in tape quality and recording techniques have permitted the use of slower tape speeds without appreciably affecting the fidelity of the recorded signal. Slower tape speeds have the inherent advantage of an increased recording time at no additional cost. However, many of the cartridge tape transports in current use are designed to operate at a single, relatively fast tape speed, for example, at a tape speed of 3¾ inches per second. Because the capstan speed is constant, owners of these cartridge tape transports cannot take advantage of technological advances without first purchasing a new transport.

SUMMARY OF THE INVENTION

According to the instant invention, a tape cartridge includes apparatus for driving an endless magnetic tape at a speed slower than the speed of a constant speed capstan in a conventional tape transport. A rotatably mounted tape drive wheel and an idler wheel are positioned adjacent the front wall of the cartridge. When the cartridge is inserted into the tape transport, the capstan in the transport drivably engages a large diameter portion of the drive wheel. The drive wheel has a smaller diameter portion which, in turn, drivably engages a loop of the endless tape. The ratio of the diameters of the small portion and the large portion of the drive wheel determines the ratio of the tape speed to the capstan speed. If, for example, the capstan is driven for a tape speed of 3¾ inches per second and the diameter of the small portion of the drive wheel is one-half the diameter of the large portion, the tape speed will be 1⅞ inches per second. The idler wheel is rotatably mounted to pinch the tape against the drive wheel, thereby maintaining a positive tape drive. A constant pressure is maintained on the tape by either biasing the idler wheel against the drive wheel or, preferably, by biasing the cartridge against the capstan and loosely mounting the drive wheel on an axle such that the capstan forces the drive wheel against the idler wheel.

The large diameter portion of the drive wheel also functions as a tape guide to prevent the vertical tape misalignment in one direction. A flange on either the idler wheel or the drive wheel similarly prevents vertical tape misalignment in the other direction. If the flange is on the drive wheel, it may be identical to and spaced from the large diameter portion for engaging the capstan with the large diameter portion.

Accordingly, it is an object of the present invention to provide an improved endless magnetic tape cartridge wherein the tape is driven at a speed slower than the capstan speed in a cooperating transport.

Other objects and advantages will become apparent from the following detailed description, reference being made to the accompanying drawings.

DESCRIPTION OF THE PREFERRED EMBODIMENTS

Figure 1:
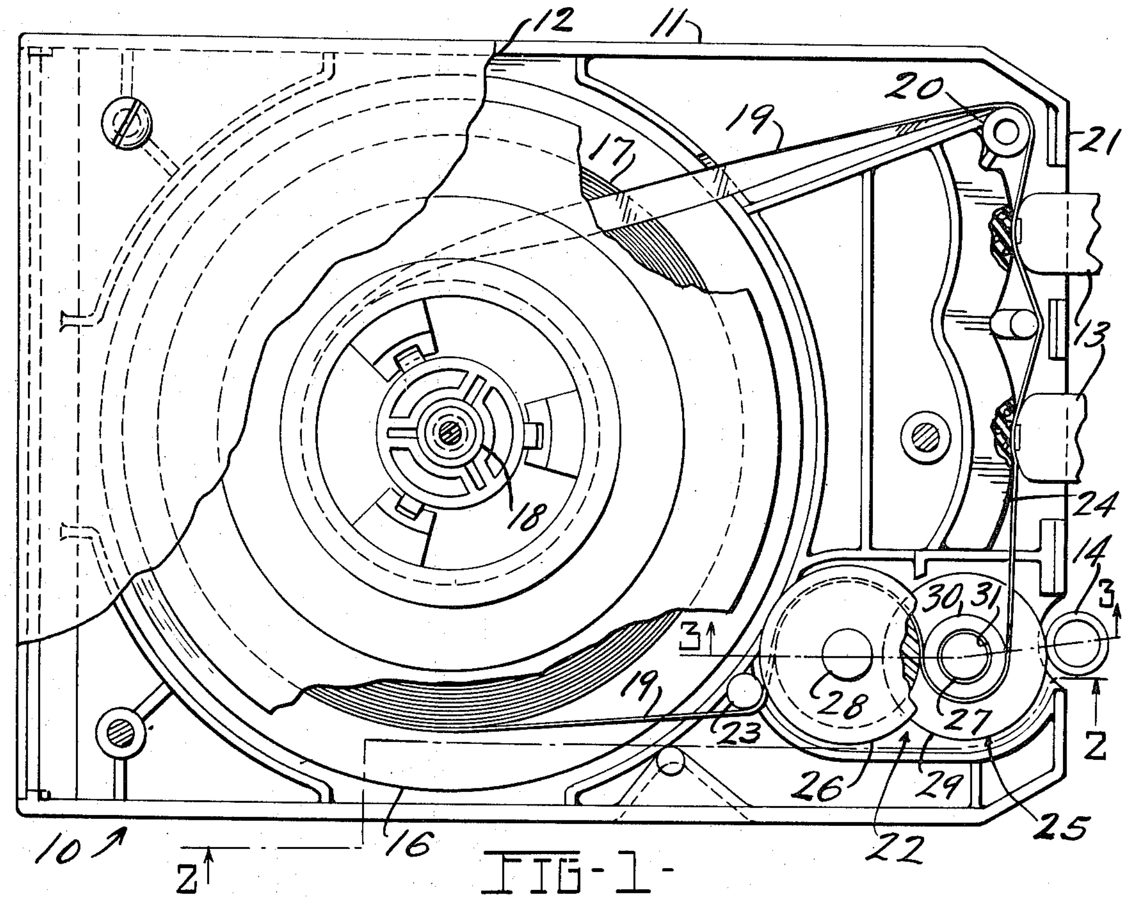
FIG. 1 is an enlarged plan view of a removable cartridge for an endless magnetic tape, according to the present invention, with the outer cover partially broken away, and showing a pair of tracking heads and a drive capstan of a commonly used recording and/or reproducing device.
Figures 2, 3, 4:
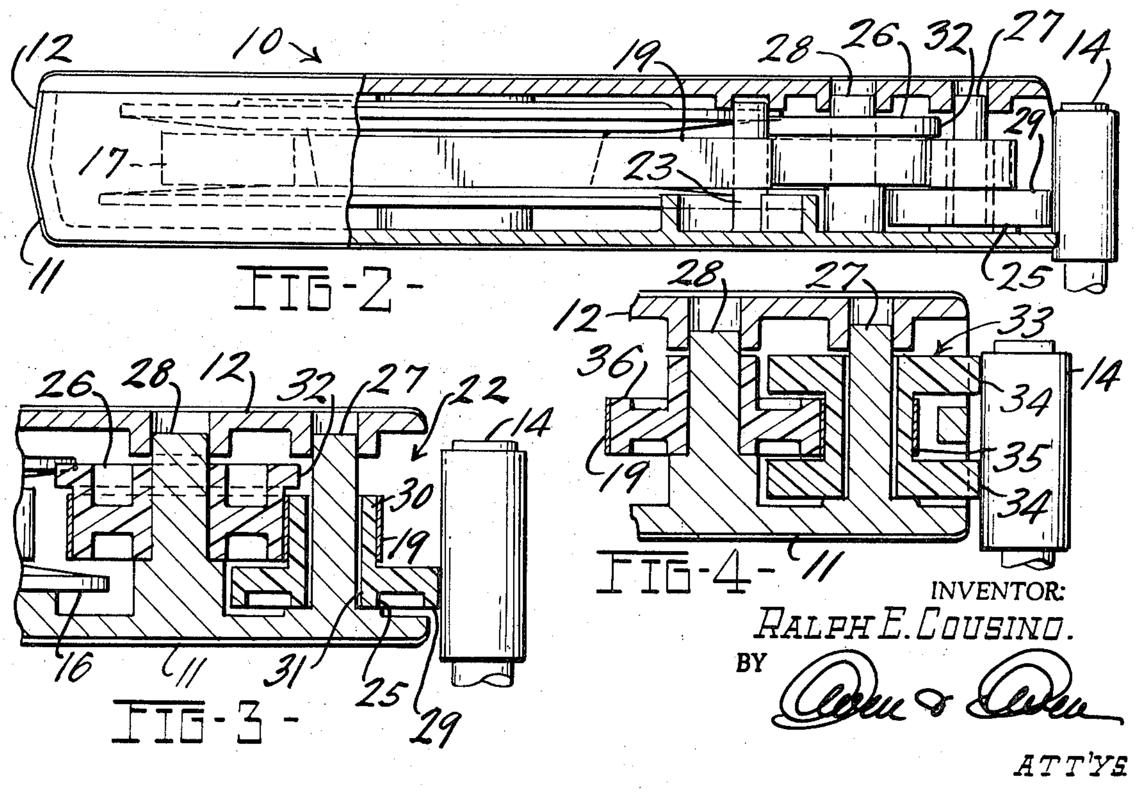
FIG. 2 is an elevational cross-sectional view of a cartridge taken along line 2—2 of FIG. 1.
FIG. 3 is an enlarged cross-sectional view of the drive wheel and the idler wheel as taken along line 3—3 of FIG. 1.
FIG. 4 is an enlarged cross-sectional view similar to FIG. 3, but showing a modified embodiment of the drive wheel and the idler wheel.

Referring now to FIGS. 1–3, a tape cartridge 10 is shown embodying the instant invention. The cartridge 10, which includes a base 11 and a cover 12, is shown positioned against a pair of tracking heads 13 and a drive capstan 14 in a conventional tape transport (not shown).

A reel assembly 16 is mounted within the cartridge 10 for storing a number of turns of an endless magnetic recording tape 17. The reel assembly 16 is mounted to rotate freely on an axle 18 which extends normally from the base 11. A single loop 19 of the tape 17 extends from the reel assembly 16 around a tape guide 20 positioned adjacent a front edge 21 of the cartridge 10. From the tape guide 20, the loop 19 extends past the pair of tracking heads 13, around a tape drive 22, a guide pin 23, and back to the reel assembly 16. A pressure pad 24 biases the loop of tape 19 against the tracking heads 13.

The improved tape drive 22 generally comprises a drive wheel 25 and an idler wheel 26, which permit driving the tape at a speed slower than the speed of the capstan 14. The drive wheel 25 is mounted to rotate on an axle 27 and the idler wheel 26 is mounted to rotate on an axle 28. Both of the axles 27 and 28 extend normally from the cartridge base 11. The drive wheel 25 includes at least one portion 29 having a predetermined large diameter for engaging the capstan 14. The drive wheel 25 also has a portion 30 having a predetermined small diameter for drivably engaging the loop of tape 19. The tape speed is determined by multiplying the ratio of the diameters of the small diameter portion 30 of the drive wheel 25 to the large diameter portion 29 of the drive wheel 25 times the speed of the capstan 14.

The idler wheel 26 is mounted to pinch the loop of tape 19 against the small diameter portion 30 of the drive wheel 25, thereby maintaining a positive tape drive. A constant pressure is maintained on the tape by either biasing the idler wheel 26 against the drive wheel 25 or, preferably, by biasing the drive wheel 25 against the idler wheel 26. The drive wheel 25 may be biased against the idler wheel 26 by providing a larger diameter axial bore 31 through the drive wheel 25 than the diameter of the axle 27. Thus, when the cartridge 10 is positioned within the tape transport or player, the capstan 14 exerts a force on the drive wheel 25 to bias the drive wheel 25 against the idler wheel 26. The efficiency of this force is increased by positioning the axes of rotation of the drive wheel axle 27 and the idler wheel axle 28 parallel to the axis of rotation of the capstan 14, but not in linear alignment with the capstan 14.

The large diameter portion 29 of the drive wheel 25 also functions as a tape misalignment guide, preventing the tape from moving in a vertical direction towards the cartridge base 11. The idler wheel 26 is provided with an enlarged flange 32 which overlaps the end of the small diameter portion 30 of the tape drive wheel 25. The enlarged flange 32 on the idler wheel 26 acts as a tape misalignment guide to prevent the tape from moving in a vertical direction towards the cover 12 of the tape cartridge 10. The two vertical tape misalignment guides eliminate the problem of the tape riding up the capstan, which often occurs in prior art cartridges.

Referring now to FIG. 4, a modification of the tape drive 22 is shown. A tape drive wheel 33 is shown having a pair of spaced large diameter portions 34 for engaging the drive capstan 14. The loop of tape 19 is driven from a small diameter portion 35 of the drive wheel 33 which extends between the spaced large diameter portions 34. As in the previous embodiment, the loop of tape 19 is pinched between an idler wheel 36 and the small diameter portion 35 of the drive wheel 33. The spaced large diameter portion 34 of the drive wheel 33 functions as misalignment guides, preventing the tape from moving vertically towards either the cartridge base 11 or the cartridge cover 12.

Both the drive wheel and the idler wheel are designed to be constructed from a synthetic resinous material. Because the instant design permits the use of a synthetic resinous material, a number of problems which occur in the prior art pressure rollers are eliminated. To maintain a positive, slip-free tape drive, prior art pressure rollers were typically made of an expensive material such as silicone rubber. In the instant invention, a positive, slip-free tape drive is maintained without the use of a silicone rubber. The loop of tape 19 is in contact with approximately 180° of the small diameter portion 30 of the drive wheel 25 and approximately 180° of the idler wheel 26 and is pressed between the drive wheel 25 and the idler wheel 26.

Another important feature of the present invention is that there is no tape exposed in the drive area between the drive wheel and the capstan. This feature eliminates the tape spillage problem found in many prior art cartridges, particularly during the start up operation of the cartridge.

What I claim is:

1. A tape cartridge for an endless sound reproducing tape comprising, in combination, a base, a tape storage reel for receiving a coil of sound reproducing tape, means for mounting said reel on said base for rotation about an axis normal to said base, a tape guide positioned adjacent a front edge of said cartridge for guiding a loop of such tape from said reel assembly and across the front of said cartridge with a major surface of such tape disposed in parallel relationship with such axis of rotation, at least one head opening defined in the front of said cartridge effective to receive a head of a reproducing apparatus, an outer cover secured to said base, a drive wheel mounted for rotation about an axis normal to said base, said drive wheel having at least one lip portion of a predetermined large diameter for engaging a driven capstan, said drive wheel further having a portion of a predetermined diameter smaller than said large diameter for engaging such tape, and an idler wheel having an edge in contact with the portion of such tape which engages said drive wheel, said idler wheel further having an enlarged flange portion, whereby the portion of such tape which engages said drive wheel is restrained from movement in one direction normal to said base by said lip portion of said drive wheel and the portion of such tape in contact with said idler wheel is restrained from movement in the other direction normal to said base by said flange portion of said idler wheel.

2. A tape cartridge for an endless sound reproducing tape comprising, in combination, a base, a tape storage reel for receiving a coil of sound reproducing tape, means for mounting said reel on said base for rotation about an axis normal to said base, a tape guide positioned adjacent a front edge of said cartridge for guiding a loop of such tape from said reel assembly and across the front of said cartridge with a major surface of such tape disposed in parallel relationship with such axis of rotation, at least one head opening defined in the front of said cartridge effective to receive a head of a reproducing apparatus, a drive wheel mounted for rotation about an axis normal to said base, said drive wheel having at least two spaced lip portions of a predetermined large diameter for engaging a driven capstan, said drive wheel further having a portion of a predetermined diameter smaller than said large diameter extending between said two spaced lip portions for engaging such tape, and an idler wheel mounted for rotation about an axis normal to said base, said idler wheel having an edge in contact with the portion of such tape which engages said drive wheel, and an outer cover secured to said base.

* * * * *